United States Patent [19]

Roux

[11] Patent Number: 5,040,181
[45] Date of Patent: Aug. 13, 1991

[54] NON-INTRUSIVE DIAGNOSTIC SYSTEM FOR A DIGITAL MODEM TRANSMISSION CHANNEL, INCLUDING AN A/D CONVERTER CLOCKED AT A MULTIPLE OF THE SYMBOL RATE

[75] Inventor: Pierre Roux, Courbevoie, France

[73] Assignee: Alcatel Transmission Par Faisceaux Hertziens, Cedex, France

[21] Appl. No.: 457,899

[22] Filed: Dec. 27, 1989

[30] Foreign Application Priority Data

Dec. 28, 1988 [FR] France ............................ 88 17312

[51] Int. Cl.$^5$ .......................................... H04B 3/46
[52] U.S. Cl. .................................... 375/10; 375/102; 455/67
[58] Field of Search ................. 375/10.75, 96, 99, 39, 375/102; 370/97, 104, 13; 455/12, 67; 324/77 R, 78 D

[56] References Cited

U.S. PATENT DOCUMENTS

| | | | |
|---|---|---|---|
| 4,726,040 | 2/1988 | Acampora | 370/84 |
| 4,745,392 | 5/1988 | Ise et al. | 375/99 |
| 4,800,507 | 1/1989 | Brown | 375/10 |
| 4,805,189 | 2/1989 | Mahoney | 315/96 |
| 4,866,395 | 9/1989 | Hostetter | 375/39 |
| 4,920,543 | 4/1990 | Martin | 375/10 |

OTHER PUBLICATIONS

IEE Global Telecommunications Conference & Exhibition, Hollywood, FL, Nov. 28, Dec. 1, 1988, vol. 1, pp. 0158–0162, IEE, New York, U.S.; H. J. Choi: "Estimation of Signal Parameters by Using Digital Techniques". p. 0159, left col., lines 1–12, 40–46; p. 0159 right col., lines 20–27, FIGS. 3,4.

Electronics, vol. 61, No. 4, Feb. 18, 1988, pp. 54D–54E, New York, US; P. Fletcher: "Ethernet Analyzer Spots Trouble before the Network Crashes", p. 54D, right col., lines 30–44.

Mesures, vol. 52, No. 14, Nov. 23, 1987, pp. 81–83, Paris, France; "Analyse de Constellation, Reellement Simple?", p. 81, median column, lines 19–24; p. 81, right column, lines 12–14.

Hewlett-Packard Journal, vol. 38, Oct. 10, 1987, pp. 4–15, Palo Alto, CA, US; N. Carder et al.: "In-Service Transmission Impairment Testing of Voice-Frequency Data Circuits", p. 13, left column, lines 1–17.

Primary Examiner—Stephen Chin
Attorney, Agent, or Firm—Sughrue, Mion, Zinn, Macpeak & Seas

[57] ABSTRACT

A non-intrusive diagnostic system for a transmission channel for a digital modem is appllied to a demodulator-regenerator, and, in each of the channels (14, 15) for the signals demodulated into baseband, it includes an analog-to-digital converter (16, 17) which is clocked by a clock signal at a frequency equal to a multiple of the symbol rate (H), said multiple being not less than twice said rate.

3 Claims, 1 Drawing Sheet

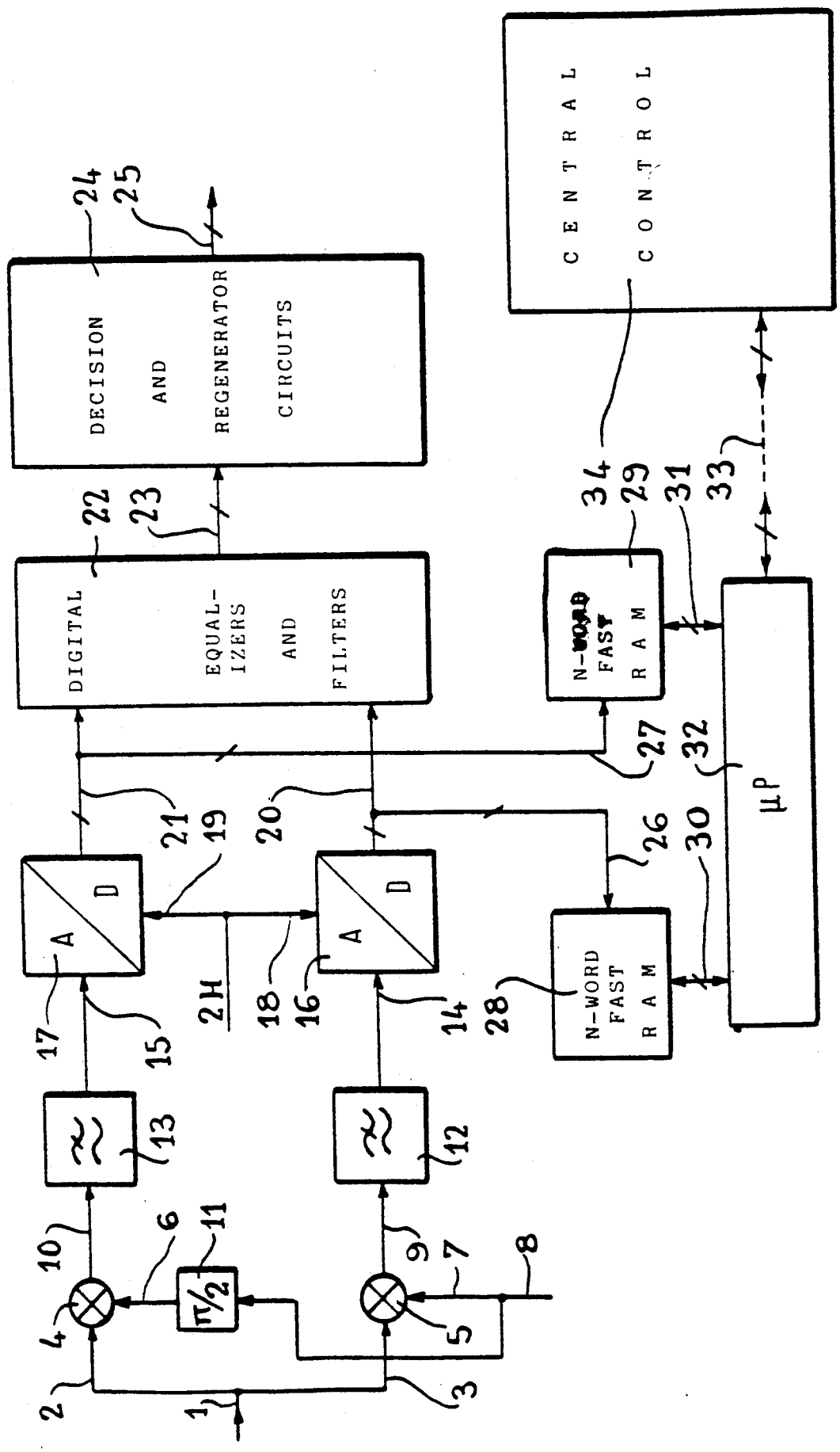

NON-INTRUSIVE DIAGNOSTIC SYSTEM FOR A DIGITAL MODEM TRANSMISSION CHANNEL, INCLUDING AN A/D CONVERTER CLOCKED AT A MULTIPLE OF THE SYMBOL RATE

The present invention relates to a non-intrusive diagnostic system for a digital modem transmission system, the system being applied to a demodulator regenerator.

BACKGROUND OF THE INVENTION

Radio beams are generally associated with tools for providing assistance in operation and maintenance. In general, the diagnosis performed by these systems on the radio beam comprises no more than handling a set of alarms for detecting non-operation of various elementary functions of the beam.

These prior systems are inaccurate when it is desired to obtain information for a given leg in a given channel concerning, inter alia:

propagation events (essentially multiple paths), together with statistics on these events as a function of their characteristics;

the channel transfer function and the consequent residual linear distortion, together with its possible slow change over time;

residual non-linear distortion; and the signal-to-noise ratio on the received signal.

Propagation events can be analyzed in a manner which is known per se by recordings making use of equipment dedicated to this task (radio link associated with a radio beam analyser). This has the drawback that while the analysis is taking place, the link equipped in this way is unusable for normal transmission purposes.

The analysis can be performed non-intrusively, i.e. without disturbing the operation of the link, by analyzing the coefficients of a delay equalizer if the beam is fitted with one. In this case, the drawback is that the analysis is limited by the characteristics of the delay equalizer. If the analyser is synchronous, then its analysis frequency window does not cover the entire signal spectrum. In addition, the frequency resolution of the analysis is limited in this case by the number of coefficients associated with the equalizer.

This method is also applicable to any other countermeasure circuit with which a digital radio beam may be fitted (frequency equalizers, diversity receivers), and it always suffers from analyzing the channel only approximately. In addition, the analysis performed always relates to distortion as corrected and never to residual distortion.

The invention seeks to remedy these drawbacks by providing a non-intrusive system for diagnosing a transmission channel for a digital modem, the system being applied to a demodulator regenerator, and being capable, inter alia, of analyzing:

the transfer function of a radio beam channel at high frequency resolution, thereby enabling multiple paths to be finely analyzed as well as analyzing modem filtering and the way it changes over time;

the residual non-linear distortion on reception;

the signal-to-noise ratio in the received signal;

the root mean square error in the received signal; and quadrature defects in the constellation.

SUMMARY OF THE INVENTION

To this end, the system includes, in each of the channels for the signals demodulated into baseband, an analog-to-digital converter which is clocked by a clock signal at a frequency equal to a multiple of the symbol rate, said multiple being not less than twice said rate.

BRIEF DESCRIPTION OF THE DRAWING

An embodiment of the invention is described by way of example with reference to the sole FIGURE of the accompanying drawing which is a block diagram of the receiver portion of a demodulator-regenerator for digital modulation, and equipped with a diagnostic system of the invention.

DETAILED DESCRIPTION

With reference to this sole figure, a signal to be demodulated at intermediate frequency or at microwave frequency is received at 1, and is applied via wires 2 and 3 to respective mixers 4 and 5 which also receive via second inputs 6 and 7 a recovered carrier signal from 8, with the mixer 5 receiving a non-shifted version of the carrier and with the mixer 4 receiving a version that is phase-shifted through 90° by a phase shifter 11.

The outputs 9 and 10 from the two mixers 5 and 4 respectively deliver demodulated baseband signals, with the output 9 being in-phase and with the output 10 being in quadrature. After passing through respective filters 12 and 13, these two signals are applied to respective to inputs 14 and 15 of two respective analog-to-digital converters 16 and 17 which have respective clock signal inputs 18 and 19 driven by the same clock signal at a frequency equal to twice the symbol frequency H, and as explained below the condition is that the frequency of the clock signal applied to the converters 15 and 16 should be not less than twice the symbol frequency $H = 1/T$, where T is the separation in time between two consecutive symbols.

In conventional manner, the demodulated and redigitized signals available at the outputs 20 and 21 from the converters 16 and 17 are respectively applied to a circuit 22 including a digital equalizer and a digital filter, with the output 23 from the circuit 22 being applied to a decision and regenerator circuit 24 providing a regenerated output signal at 25.

In accordance with the invention, the above-mentioned outputs 20 and 21 are also connected via respective multi-wire connections 26 and 27 to two fast-write memories 28 and 29 which are identical and which are of depth N (i.e. each of them is capable of storing a maximum total of N words). These memories 28 and 29 are controlled via multi-wire connections 30 and 31 by a microprocessor 32. The microprocessor 32 is itself connected over digital service channels 33 to a central control and calculating logic unit 34.

The analog-to-digital converters 16 and 17 are systematically sampled at a minimum rate of $2H = 2/T$, and they provide adequate resolution (e.g. 8 bits). Such constraints are automatically satisfied if the modem is fitted with digital reception filtering or with a fractioned digital transversal equalizer, as is the case at present.

The two fast-write digital memories 28 and 29 store successive digital samples corresponding to the in-phase channel 20 and the quadrature channel 21 over a time interval which is selected to be equal to $NT/2$. The microprocessor 32 controlling these memories may respond to a request from the central computer 34 delivered over digital service channels 33 by causing these memories to record the N samples that follow the instruction to record. Thereafter it may access the contents of the recording and transmit said contents over the digital service channels 33 to the central computer 34 which then analyzes said contents.

The computer 34 then has a sample of length NT/2 of the complex signal (i.e. having in-phase and quadrature components) as available after filtering, and it is capable of estimating the transmitted complex signal prior to filtering exactly even if there is considerable distortion giving rise to an error rate in the transmission, and it is thus capable, e.g. by using Fourier transforms, of calculating the transfer function of the channel with an analysis frequency window equal to 2/T and with a frequency resolution equal to 2/NT. In order to obtain such fine analysis by observing the coefficients of a fractioned equalizer, it would be necessary to have an equalizer fractioned into N coefficients, and that would be far more complex.

Statistical analysis of the constellation received from this signal sample can also be used for calculating the residual non-linear distortion (e.g. in the form of amplitude-amplitude and amplitude-phase curves), quadrature error, etc. From a plurality of consecutive recordings, the computer 34 is capable of distinguishing slow drift in the equipment from rapid changes due to propagation events, or from erratic variations due to thermal noise, thereby quantifying thermal noise.

Naturally, the invention is not limited to the embodiment described above. In this example, the microprocessor 32 is used merely for handling data interchanges over the digital service channels 33 with the central computer 34, and thus constitutes a terminal station, for example. However, it would also be possible for the microprocessor 32 to perform the diagnosis by examining the sample it has recorded. In this case the diagnosis would be local, rather than being performed for an entire radio beam connection. The clock signal applied at 18 and 19 to the analog-to-digital converters 16 and 17 is a signal at frequency 2H in order to satisfy Shannon's theorem since the spectrum used contains components at higher than the symbol rate. Naturally, this frequency could be greater than the minimum value 2H.

I claim:

1. A non-intrusive diagnostic system in a digital radio beam channel for a modem which modulates and demodulates a digital signal, said system comprising:
    a first mixer which receives the signal to be demodulated and a non-shifted version of the carrier;
    a second mixer which receives the signal to be demodulated and a 90° phase-shifted version of the carrier;
    a first analog-to-digital converter for receiving and digitizing an output from said first mixer;
    a second analog-to-digital converter for receiving and digitizing an output from said second mixer;
    digital equalizer/filter means for receiving the outputs from said first and said second analog-to-digital converters;
    first memory means for storing a number N of samples of a digital signal output from said first analog-to-digital converter;
    second memory means for storing a number N of samples of a digital signal output from said second analog-to-digital converter; and
    control means for controlling said first and said second memory means to store successive digital samples;
    wherein the frequency of a clock signal applied to said first and said second analog-to-digital converters is equal to a multiple of the symbol rate 1/T of said digital signal, said multiple being not less then twice said rate; and
    wherein said control means controls said first and said second memory means to store successive digital samples over a time period of NT/2.

2. A system according to claim 1 wherein said control means performs real-time processing to generate diagnostic results while said digital equalizer/filter receives the outputs from said first and said second analog-to-digital converters.

3. A system according to claim 1, wherein said control means is capable of reconstituting a sequence of transmitted symbols from the sequence of received signals in order to perform diagnosis on the digital radio beam channel, relating, inter alia, to its transfer function, to propagation events, to non-linearities, and to thermal noise.

* * * * *